United States Patent
Sibbett

(10) Patent No.: US 9,671,297 B2
(45) Date of Patent: Jun. 6, 2017

(54) PLIABLE PRESSURE-SENSING FABRIC

(71) Applicants: STC.UNM, Albuquerque, NC (US);
Scott Sibbett, Corrales, NM (US)

(72) Inventor: Scott Sibbett, Albuquerque, NM (US)

(73) Assignee: STC. UNM, Albuquerque, NM (US)

(*) Notice: Subject to any disclaimer, the term of this patent is extended or adjusted under 35 U.S.C. 154(b) by 0 days.

(21) Appl. No.: 14/434,313

(22) PCT Filed: Oct. 7, 2013

(86) PCT No.: PCT/US2013/063738
§ 371 (c)(1),
(2) Date: Apr. 8, 2015

(87) PCT Pub. No.: WO2014/058806
PCT Pub. Date: Apr. 17, 2014

(65) Prior Publication Data
US 2015/0292964 A1    Oct. 15, 2015

Related U.S. Application Data

(60) Provisional application No. 61/711,038, filed on Oct. 8, 2012.

(51) Int. Cl.
  *G01L 1/22* (2006.01)
  *B25J 19/02* (2006.01)
  (Continued)

(52) U.S. Cl.
  CPC .............. *G01L 1/22* (2013.01); *B25J 19/02* (2013.01); *G01L 1/04* (2013.01); *G01L 1/18* (2013.01);
  (Continued)

(58) Field of Classification Search
  CPC ...................................................... G01L 1/205
  See application file for complete search history.

(56) References Cited

U.S. PATENT DOCUMENTS 4,492,949 A * 1/1985 Peterson ............... B25J 13/084
                                                338/114
4,866,412 A * 9/1989 Rzepczynski ......... G06F 3/0414
                                                338/114
(Continued)

FOREIGN PATENT DOCUMENTS

JP    2003-075277 A    3/2003
KR    101169943 B1     8/2012
WO    2012095608 A2    7/2012

OTHER PUBLICATIONS

Korean Intellectual Property Office; International Search Report & Written Opinion for PCT/2013/063738 issued on Jan. 6, 2014; Daejeon Metropolitan City; Republic of Korea.

*Primary Examiner* — Lisa Caputo
*Assistant Examiner* — Tran M Tran
(74) *Attorney, Agent, or Firm* — Keith A. Vogt; Vogt IP

(57) ABSTRACT

A pliable pressure sensitive sensor device and method of making the same is provided. The sensor includes first and second pliable protective layers, which cover sets of conductive fibers that spatially separated by an electrically conductive pliable layer, which deforms in response to a pressure event. The fiber sets form a grid pattern and are in electrical communication with sets of electrical contacts located in predetermined locations along the fibers. In response to a pressure event in proximity to the contact, the pliable layer deforms and increases the amount of surface area in contact with an electrical contact whereby an electrical resistance at an individual electrical contact decreases in response to the pressure event.

20 Claims, 14 Drawing Sheets

(51) Int. Cl.
*G06F 3/041* (2006.01)
*G01L 1/18* (2006.01)
*G01L 1/20* (2006.01)
*G01L 1/04* (2006.01)
*G06F 3/045* (2006.01)
*B25J 13/08* (2006.01)
*G01L 5/16* (2006.01)

(52) U.S. Cl.
CPC .............. *G01L 1/205* (2013.01); *G06F 3/041* (2013.01); *G06F 3/045* (2013.01); *G06F 3/0414* (2013.01); *B25J 13/084* (2013.01); *G01L 5/162* (2013.01)

(56) References Cited

U.S. PATENT DOCUMENTS

| | | | | |
|---|---|---|---|---|
| 5,060,527 A * | 10/1991 | Burgess | ............. | G01L 1/205 338/47 |
| 5,079,949 A * | 1/1992 | Tamori | ............. | G06F 3/045 338/99 |
| 6,155,120 A * | 12/2000 | Taylor | ............. | A61B 5/1036 73/862.046 |
| 6,216,545 B1 * | 4/2001 | Taylor | ............. | A61B 5/1036 73/862.046 |
| 6,543,299 B2 * | 4/2003 | Taylor | ............. | G01L 1/205 73/862.046 |
| 7,159,471 B2 * | 1/2007 | Fortune | ............. | G01G 19/4142 177/210 C |
| 7,161,084 B2 * | 1/2007 | Sandbach | ............. | G06F 3/023 174/117 M |
| 7,217,244 B2 * | 5/2007 | Suzuki | ............. | A61B 5/02444 600/481 |
| 7,258,026 B2 * | 8/2007 | Papakostas | ............. | G01L 1/20 73/862.041 |
| 7,301,435 B2 * | 11/2007 | Lussey | ............. | H01H 3/141 219/545 |
| 7,430,925 B2 * | 10/2008 | Son | ............. | G01L 1/205 73/862.046 |
| 7,980,144 B2 * | 7/2011 | Chang | ............. | G01L 1/205 73/760 |
| 8,044,665 B2 * | 10/2011 | Joutsenoja | ............. | G01R 19/145 324/457 |
| 8,069,735 B1 * | 12/2011 | Egorov | ............. | A61B 5/0053 73/862.041 |
| 8,106,663 B2 * | 1/2012 | Joutsenoja | ............. | G01R 19/145 324/457 |
| 8,127,623 B2 * | 3/2012 | Son | ............. | G01L 1/146 178/18.06 |
| 8,161,826 B1 * | 4/2012 | Taylor | ............. | G01L 1/18 73/862.041 |
| 8,276,467 B2 * | 10/2012 | Fritzsche | ............. | B25J 13/084 73/862.046 |
| 8,661,915 B2 * | 3/2014 | Taylor | ............. | G01L 1/18 73/862.041 |
| 8,773,393 B2 * | 7/2014 | Cok | ............. | G06F 3/044 178/18.06 |
| 8,819,927 B2 * | 9/2014 | Cok | ............. | H01G 4/38 29/592.1 |
| 8,884,913 B2 * | 11/2014 | Saynac | ............. | G06F 3/0414 178/18.01 |
| 8,884,918 B2 * | 11/2014 | Cok | ............. | G06F 3/044 345/173 |
| 8,904,876 B2 * | 12/2014 | Taylor | ............. | G01L 1/18 361/283.4 |
| 8,966,997 B2 * | 3/2015 | Taylor | ............. | B32B 5/26 73/862.041 |
| 2002/0194934 A1 * | 12/2002 | Taylor | ............. | G01L 1/205 73/862.046 |
| 2008/0093687 A1 | 4/2008 | Antaki | | |
| 2010/0090299 A1 | 4/2010 | Chang et al. | | |
| 2012/0116251 A1 * | 5/2012 | Ben-Shalom | ............. | A61B 5/11 600/587 |
| 2012/0162122 A1 * | 6/2012 | Geaghan | ............. | G06F 3/0414 345/174 |
| 2012/0234105 A1 * | 9/2012 | Taylor | ............. | G01L 1/18 73/862.046 |
| 2014/0373594 A1 * | 12/2014 | Remez | ............. | G01L 25/00 73/1.08 |

* cited by examiner

Unstressed condition:

Stressed condition:

Resistance vs Force for a Silicone Rubber Tactile Sensor Cell[10]

PLIABLE PRESSURE-SENSING FABRIC

CROSS-REFERENCE TO RELATED APPLICATIONS

This application claims the benefit U.S. Provisional Application No. 61/711,038, filed Oct. 8, 2012 and herein incorporated by reference.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Field of the Invention

Tactile sensing technology is built into common products such as touch screens and elevator buttons. For these types of products, the sensing of load, pressure, location, proximity and/or stress is usually based on one of five main technologies: capacitive, strain, piezoresistive, elastoresistive, or whiskers.

However, in applications requiring the sensor to conform to a shape, such as in robotic applications, a typical design criterion is the ability to conform an array of tactile sensors over a curving surface such as, for example, the inherently anthropomorphic shape of robot "fingers" or other curvaceous biomimetic appendages. As a result, conformability of tactile sensor arrays has been an area of extensive research.

A typical sensor array is fabricated by attaching or forming a plurality of sensors on a surface, sheet or net. Commercial examples include the devices of Tekscan Inc. of South Boston, Mass., and Vista Medical Ltd. of Winnipeg, Canada. Tekscan devices are fabricated on plastic Mylar sheets, and are therefore generally unsuited for wrapping human appendages due to limited pliability, or for direct contact with human skin due to the non-porous nature of the Mylar sheets. In contrast to Tekscan devices, Vista Medical devices are built on pliable fabric; therefore they do not have the disadvantage of stiff and non-breathable plastic sheets.

Another problem in designing a pressure sensor array is related to the fact that conventional elastoresistive pressure sensors require 2 unique electrical wires, each connected to a central controller. Therefore as the number of sensors increases, there is a commensurate increase in the width of the round or ribbon cable that connects the array to a controller. In many circumstances, this results in a wire bundle or ribbon cable that is physically constraining to ordinary use, as for instance in a patient-care setting. A common design criterion is that a given pressure sensing array be large enough for whole-body sensing, in which case the total number of sensors can be quite large even when the area density of sensors is relatively low. When each tactile sensor in an m×n array of sensors is individually wired to controller unit, then the number of required wires is given by multiplying 2 by m by n. If a whole-body pressure-sensing fabric were to be 6 feet in length and 4 feet in width, and the sensor-to-sensor pitch were to be 1 inch on a square layout, then the total number of wires connected to the controller would be 6,912. Another common design criterion is to mimic the pressure-sensing capability of the tip of the human index finger, which contains approximately 2,000 sensing tactile sensors per square centimeter. A conventional sensor array that is the size of a typical fingertip, 2 $cm^2$ in area, at a density of 2,000 sensors per $cm^2$ will require 8,000 unique wires connected to the controller. For a given square area of sensing, any increase in sensing resolution requires a commensurate increase in the total number of signal transmission wires. So, too, as the square area of the sensor array increases, the ribbon cable (or, optionally, cable bundle) tends to become an ever stiffer and/or heavier appendage of the array. If the wire and insulation diameters are held constant, increased resolution or square area requires either a wider ribbon cable, or smaller transmission wires of a cable bundle.

Alternatively, attempts to shrink the wire and/or wire insulation can lead to electrical interference during signal transmission either between adjacent wire pairs, or from ambient signal or noise. Both Vista Medical devices and Tekscan devices require an interconnecting ribbon cable whose size varies in proportion to the number of sensors.

A solution to the problem of a large interconnecting cable has been demonstrated by Shimojo, U.S. Pat. No. 7,784,362, which is incorporated herein by reference in its entirety Shimojo employs a m×n array of elastoresistive tactile sensors, but requires only 4 individual wires connected to the controller, regardless of how large m and n may be. However, Shimojo's approach results in the loss of information from individual tactile sensors. The specific information obtainable by Shimojo's approach is limited to determining the center of the load distribution (the x,y location within the array corresponding to the maximum/peak load), and the magnitude of the center of the load distribution (i.e., the total force applied to the array of sensors). In certain applications, this loss of information is deemed acceptable in light of the advantage of avoiding a bulky and/or stiff cable bundle, or very wide ribbon cable.

A second feature of Shimojo's approach is the use of a stiff network of soldered resistors. The resulting net of metal wires and resistors can be caused to conform to various shapes by the force of human hands or by the use of tools. However, once put in a given shape, the network of wired resistors retains that shape until forced again to adopt some new shape. The network is only flexible under substantial manual force; it is not pliable in the manner of a piece of cloth or Saran Wrap™. Moreover, the incorporation of discrete resistors in Shimojo's fabrication introduces hard protuberances that are incompatible with certain pressure-sensing applications, particularly medical applications involving a pressure-sensing fabric placed adjacent to or in intimate contact with human skin.

Thus, there is a need for a tactile sensor array device that simultaneously solves the "large cable problem", the inflexibility problem, and the bump problem.

In addition, fabricating electrical connections, and in ensuring that the resulting connections are reliable over the desired lifetime of the device is also a design criteria since integrating active electrical devices with pliable media such as paper, fabric, or thin polymer films presents unique challenges. For example most paper and fabrics are incompatible with the chemical etchants and solvents used to create by lithography the wire traces of a printed circuit board. In addition, most paper and fabric are incompatible with the elevated temperatures used in soldering wires and/or electrical components. Moreover, many pliable electronic devices contain special materials (such as conductive or semi-conducting polymers, conductive inks, and conductive paper) which are intolerant of elevated temperatures.

Pliable electronic devices also may require that the device be thin in the direction normal to the surface of a piece of paper, fabric or thin polymer film. This is common, for instance, with tactile sensing applications. However, most conventional connectors (such as crimped connections, interconnecting cables, harnesses, barrier strips, and plugs) are not thin enough to be integrated into a paper, fabric or thin polymer film device without compromising device specifications.

The present invention also provides a novel design that creates a reliable electrical connection suited for pliable active electronic devices.

BRIEF SUMMARY OF THE INVENTION

The present invention provides a solution to the above problems. It provides a novel method of fabrication and design of highly pliable pressure-sensing arrays. The invention is easily scaled to fabricate devices of a large sensing area, but without requiring more than 4 signal transmission lines. This results in a thin, multi-laminate composite with high pliability and correspondingly low flexural rigidity.

The present invention can be operated using at least two different methods of control: (1) Shimojo's operating principles using a 4-wire output; and (2) conventional raster scan, using a cable that contains 2×m×n wires.

The present invention includes a pliable pressure sensitive sensor having first and second pliable protective layers which overlap an electrically conductive pliable layer which deforms in response to a pressure event and is made of a material which has surfaces having asperities. Also, semiconductive wires and electrical contacts or coupons located on opposing sides of the conductive pliable layer and under the protective layers form opposingly located grids. A pressure event at a localized area on the grid of the sensor is registered as a result of the flattening of the asperities causing an increase in the surface area contacting the local coupon. This results in a change in electrical resistance which can be detected and measured.

A primary distinguishing feature of the present invention, as compared to prior sensors, is the use of continuous, semi-conducting, pliable fibers, which replace the discrete resistors and metal wires in Shimojo's sensor network.

DETAILED DESCRIPTION OF THE INVENTION

The following description of the preferred embodiments describes an individual sensor and array of sensors that have a wide range of applications. The structure and method of fabrication disclosed concern an embodiment involving an m×n array of tactile sensors, plus 4 bus lines and associated electrical circuitry. However, other configurations are within the scope of the invention.

Figure 1:
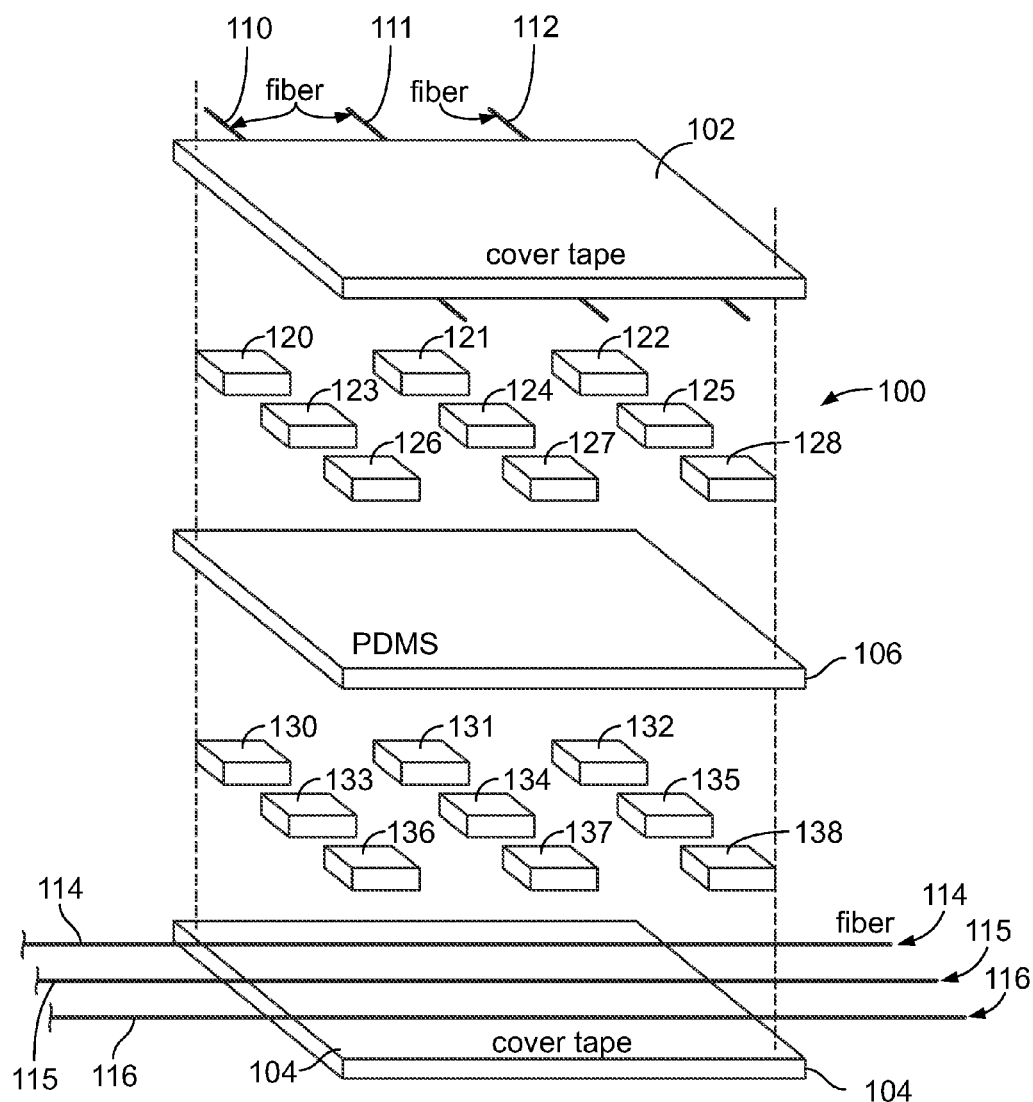
FIG. 1 is an exploded orthogonal view of one embodiment of the present invention.
Figure 2:
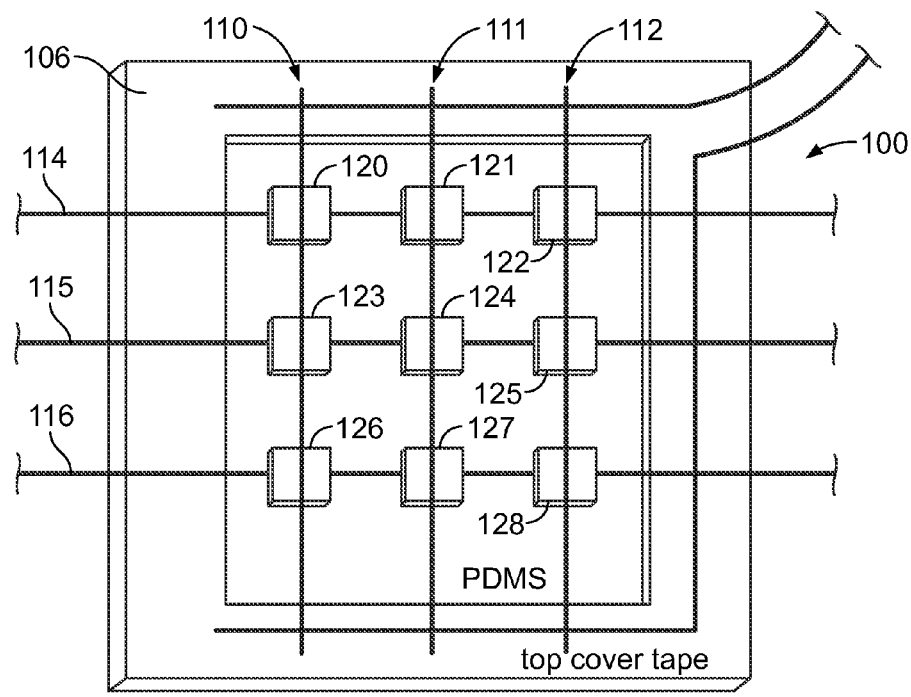
FIG. 2 is a top view of the embodiment of the present invention shown in FIG. 1.
Figure 3:
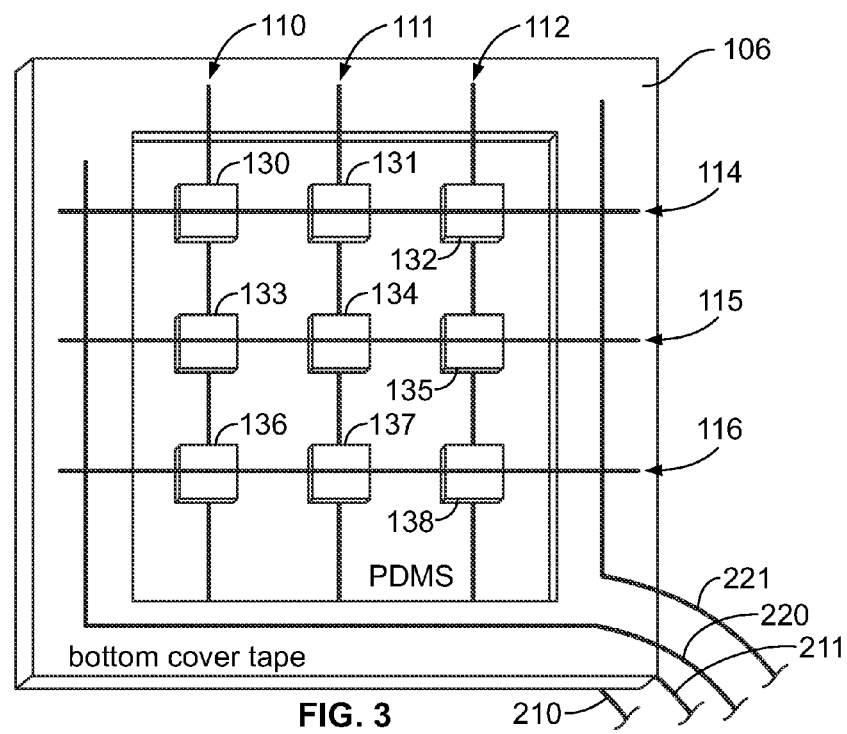
FIG. 3 is a bottom view of the embodiment of the present invention shown in FIG. 1.

As shown in FIGS. 1 through 3, an embodiment of the present invention concerning an individual sensor 100 includes a first protective layer 102 and an opposing protective layer 104. Protective layers 102 and 104 may be any pliable, protective surface covering. Using an adhesive cover tape is preferred since the adhesive side may be used to secure and hold later described structural elements. A preferred layer is Tegaderm™ (3M Company, St. Paul, Minn.), because it has the pliability of Saran Wrap™ (therefore sensor 100 has the same pliability). The cover tape can also be a cellophane tape (e.g., cat. no. 810 of 3M Company), or a vinyl cover tape (e.g., part number GL-166-clear of G&L Precision Die Cutting, Inc., San Jose, Calif.).

Also provided is an electrically conductive pliable layer 106 which deforms in response to a pressure event disposed between protective layers 102 and 104. Layer 106 preferably includes surfaces having asperities that are on the microscale. Layer 106 may be a conductive form of poly (dimethyl)siloxane silicone rubber; as for example, that of PCR Technical Co., Hiratsuka City, Kanagawa Prf., Japan (model number CSA/type PK, 0.5 mm thick). Layer 106 in a basic form may be any elastomeric polymer that has been made electrically conductive by adding conductive particles including, but not limited to, carbon black, graphite powders and particles, carbon nanotubes, metal particles and in other ways known to those of skill in the art. Examples of suitable polymer binders include rubber, silicone rubber, PDMS, ACS rubber (acrylonitrile-chlorinated polyethylene-styrene), PTFE (poly tetra fluoro ethylene), and EVA (ethyl vinyl acetate). Layer 106 can also comprise a carbon-enriched foam or a sheet of elastoresistive material (e.g., PDMS). Typical thicknesses of layer 106 are 0.1-5 mm.

Alternatively, instead of a continuous sheet, the layer 106 may comprise solidified dots (e.g., circles) of conductive PDMS, applied in liquid or paste form by a 3-axis (or more) Numerically Controlled (NC) machine with an ink-tip applicator.

In other embodiments of the present invention, layer 106 may include uniform, regular, and/or periodic micro-structured features, such as micro-structured pillars or pyramids. Using microstructures creates voids that enable the micro-structured surfaces to elastically deform on application of an external pressure, hereinafter called a pressure event, thereby storing and releasing the energy reversibly, and thus minimizing the problems associated with visco-elastic behavior. Also, micro-structured films display improved pressure sensitivity over unstructured films of the same thickness.

As also shown in FIGS. 1 through 3, disposed on opposite sides of layer 106 are a first row of conductive wires 110-112 and a second row of conductive fibers 114-116, which are preferably semi-conductive. While spatially separated by layer 106, on two different level planes, the wires are arranged in parallel rows to create a grid pattern as shown in FIGS. 2 and 3. In general, the spacing between fibers (i.e., the "grid spacing"), can range from 0.5-5 cm, and is preferably equal to 0.75 cm. Accurate placement is preferable since inconsistency in the spacing creates pseudo-resistors that degrade performance. It has also been found that optimum sensing performance depends on well-defined spacing between sensors in the array. This is because the magnitude of resistance imparted by a given fiber between two sensors is a function of the length of fiber connecting the two sensors.

The fibers may be any semi-conductive fiber. For example, the fibers may be a modified 6,6 nylon from Jarden Applied Materials/Shakespeare Conductive Fibers, Enka, N.C. ("Resistant" fiber, model number F9416). It has also been found that adding approximately 4.2 additional clockwise twists per inch of fiber to the as-supplied product reduces electrical interference of electrically-transmitted signals, and thereby enhances sensor array performance.

In general, the semi-conductive fibers of this type (i.e., yarn), can have a twist in the range of 2-6 twists per inch of fiber. In general, the semi-conductive fibers can have a range of conductivity from 100-20,000 ohm/cm. A preferred conductivity is about 5,000 ohm/cm. The modified 6,6 nylon fiber (Resistant fiber) is a yarn comprising 40 mono-filaments. Each yarn is Z-twisted 2.5 turns per inch and heat set by the manufacturer. It is desirable to further twist the yarn to yield a final fiber diameter of approximately 0.5 mm.

The semi-conductive fibers replace the discrete resistors in prior sensor arrays. As a result, additional pliability is achieved by the invention while also eliminating or reducing any raised surfaces.

At the intersection of the fibers on the grid, an electrical conductor or coupon is located. As shown in FIGS. 1 through 3, a first set of coupons 120-128 are separated from a second set of coupons 130-138 by layer 106.

Coupon refers to any electrically-conductive, relatively thin, strong material, such as a metal, metal alloy, carbon, graphite, composite, or combinations thereof. A preferred metal coupon is made of annealed or unannealed copper, such as 0.076 mm thick copper foil of K&S Precision Metals, Chicago, Ill. (part number 6015). Other electrically conductive coupons may be used, e.g., those cut from metal foils of aluminum (such as Reynolds Wrap™ aluminum foil of Reynolds Consumer Products, Inc.), gold, silver, etc., or those cut from conductive carbon-based. In addition, non-metallic materials may be used as well such as conductive graphite.

The thickness of the coupons typically range from 0.01-0.2 mm thick. The conductivity of the metal coupons are typically 1-200 microohm-cm.

To prevent layer 106 from adhering to a coupon, a coupon may include a rough surface. This may be accomplished by sanding, chemical etching or sandblasting or in other ways known to those of skill in the art.

The multi-layer composite structure of the present invention may be assembled or fabricated as described in the following steps for an embodiment of the present invention configured as a 3×3 array of sensors. However, m×n arrays of any size can be fabricated in a similar fashion.

Figure 4:
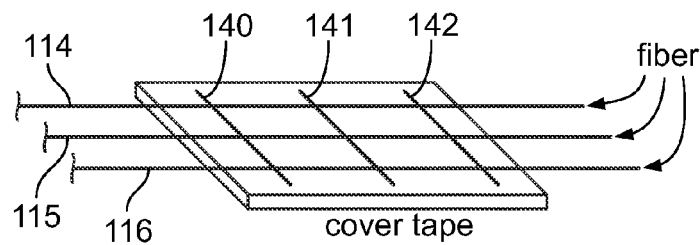
FIG. 4 is an orthogonal view of another embodiment of the present invention.

One of the protective layers 102 or 104, which for this example includes a side having adhesive thereon is sized as desired and placed, adhesive side up, on a flat working surface. A set of semi-conductive fiber is then laid in parallel rows on the adhesive, typically with the aid of a mechanical device or jig, resulting in a partially assembled sensor. The adhesive secures the fibers in position. Optionally, as shown in FIG. 4, a second set of parallel fibers 140-142 may be placed at this time, orthogonal to the first set of fibers 114-116. In addition, the same configuration may be used for the opposing set of fibers as well.

The conductive metal coupons 120-128 and 130-138, typically of a planar and pliable thin metal foil, are placed in a regular array on the fibers, each coupon is centered upon a fiber or intersection of fibers when a grid pattern is used. The location of the coupons may be at other predetermined locations as well. The shape of each coupon may be square, circular, oval, or in other desired shapes. To produce a fabric in which the sensing response to a given applied force is equivalent or nearly equivalent at all individual sensors within the array, it is preferred that all metal coupons be of the same material, shape and dimensions. Alternatively, to produce a fabric in which the sensing response to a given applied force is greater or lessor at one or more sensors, the size of coupons at those individual sensors can be increased or decreased, respectively.

An appropriately sized sheet of conductive PDMS (or equivalent conductive elastomeric material), which serves as layer 106, is placed on top of the coupons, fibers, and cover tape that has already been assembled, covering all of the coupons, and resulting in a partially assembled device.

Figure 5:
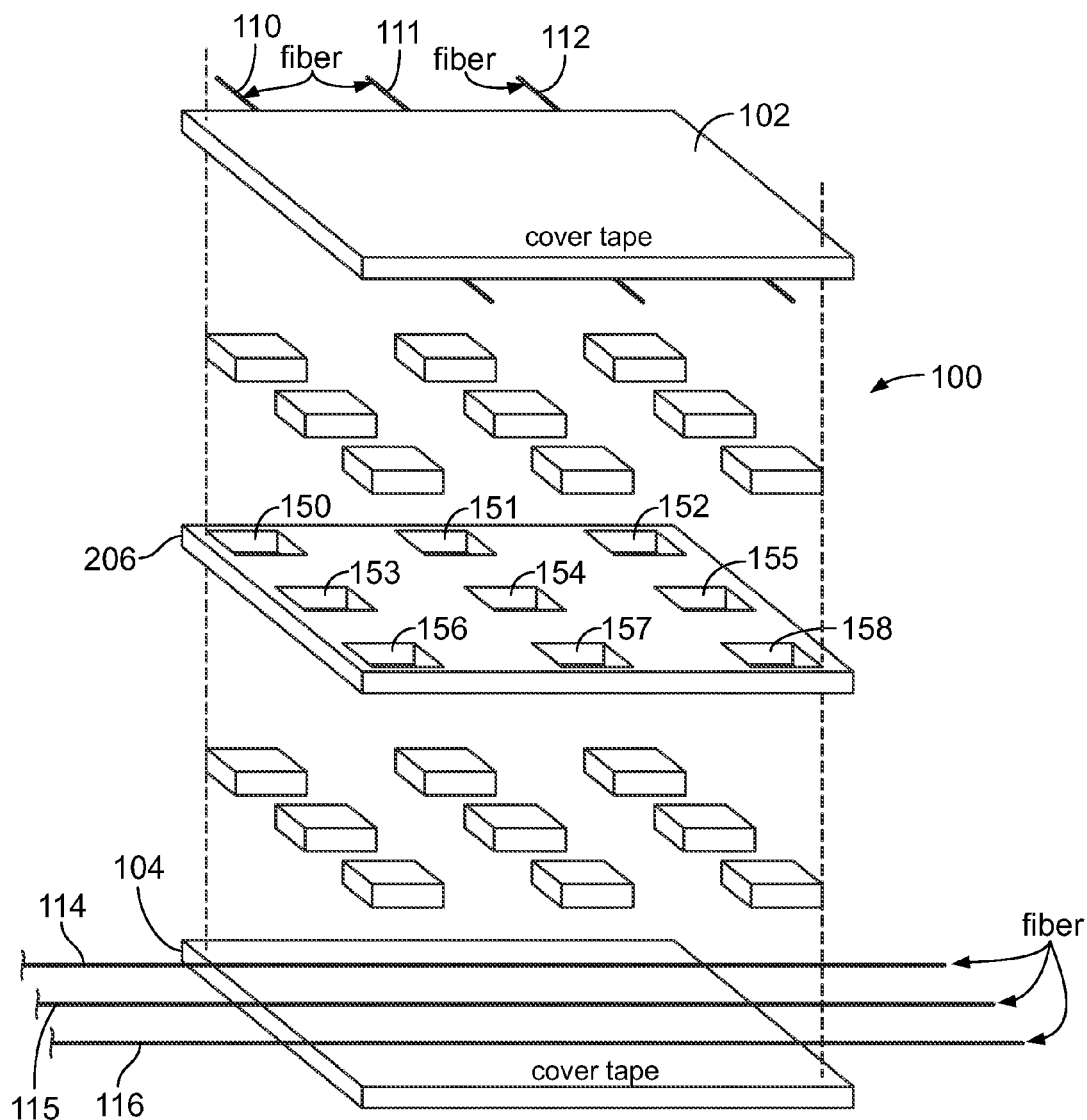
FIG. 5 is an exploded orthogonal view of another embodiment of the present invention.
Figure 6:
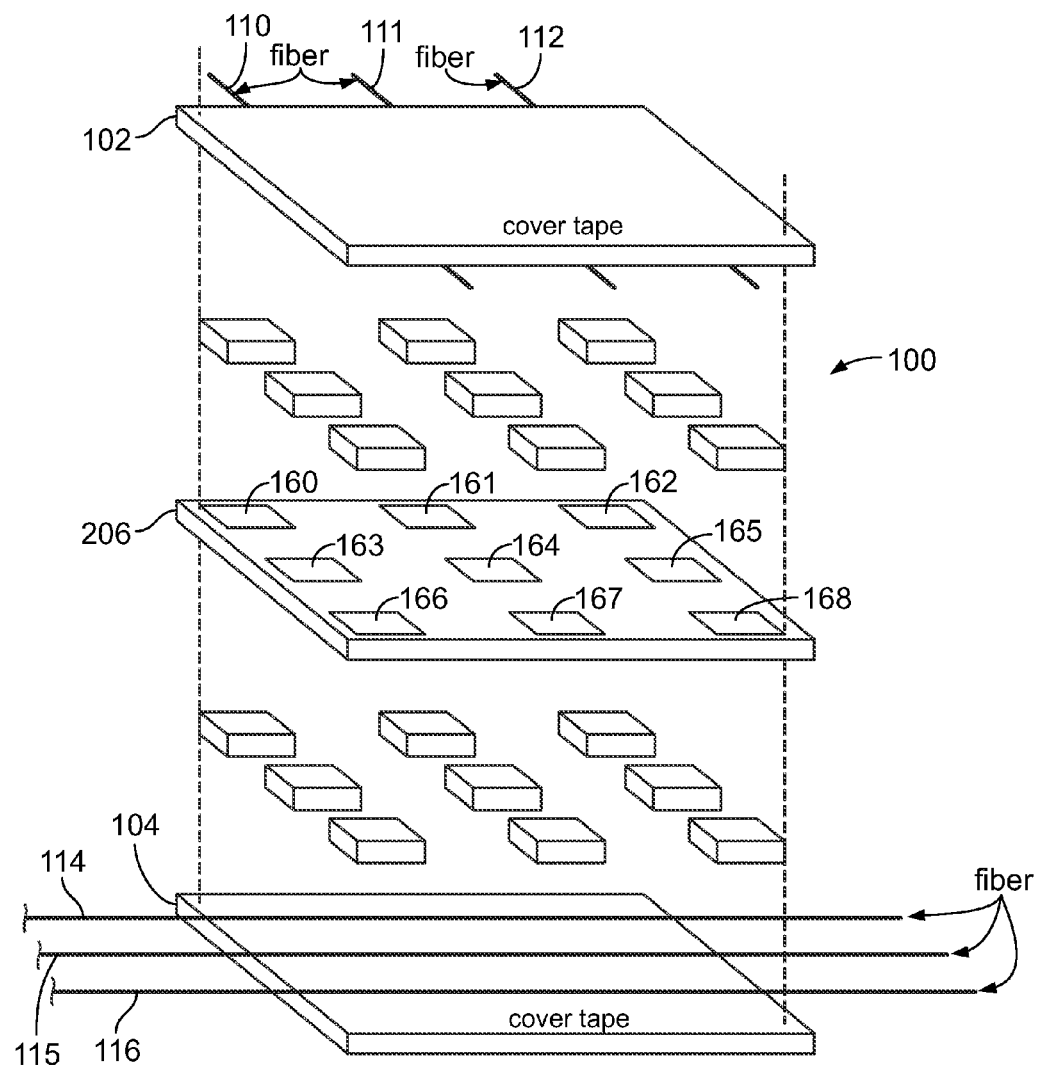
FIG. 6 is an exploded orthogonal view of the embodiment shown in FIG. 5 with PDMS inserts added.

In an alternate embodiment shown in FIG. 5, layer 206 may be a sheet of flexible, insulating material, such as polyvinyl film, into which through-holes 150-158 ("vias") are cut. PDMS coupons 160-168 are then placed in each of the holes, as depicted in FIG. 6. An advantage of this embodiment is that less PDMS material is used to fabricate a device, and thus in some circumstances it may be substantially less expensive to fabricate.

A second, opposing set of conductive metal coupons 130-138 are positioned with respect to layer 106 with each coupon centered in a position directly opposite to, and spatially separated from the other corresponding coupon by layer 106. Placement of the second set of coupons can optionally be performed with a mechanical device or jig.

Optionally, (not illustrated) one set of coupons may be fabricated larger in area than the mating set, to allow for some degree of mis-registration of one set of coupons relative to the other, and thereby maintain a constant area of through-PDMS electrical contact between adjacent coupons.

As described above, a second set of pre-twisted fibers 114-116 are positioned in parallel rows in relation to metal coupons 130-138, typically with the aid of a mechanical device or jig. The fiber sets are typically positioned so as to form an orthogonal grid. However, other arrangements may be constructed with a preferred arrangement being a repeating pattern of consistent spacing including points of intersection. A second protective layer is then applied as described above. Thus, no individual soldered resistors are required in the present invention.

Figure 7:
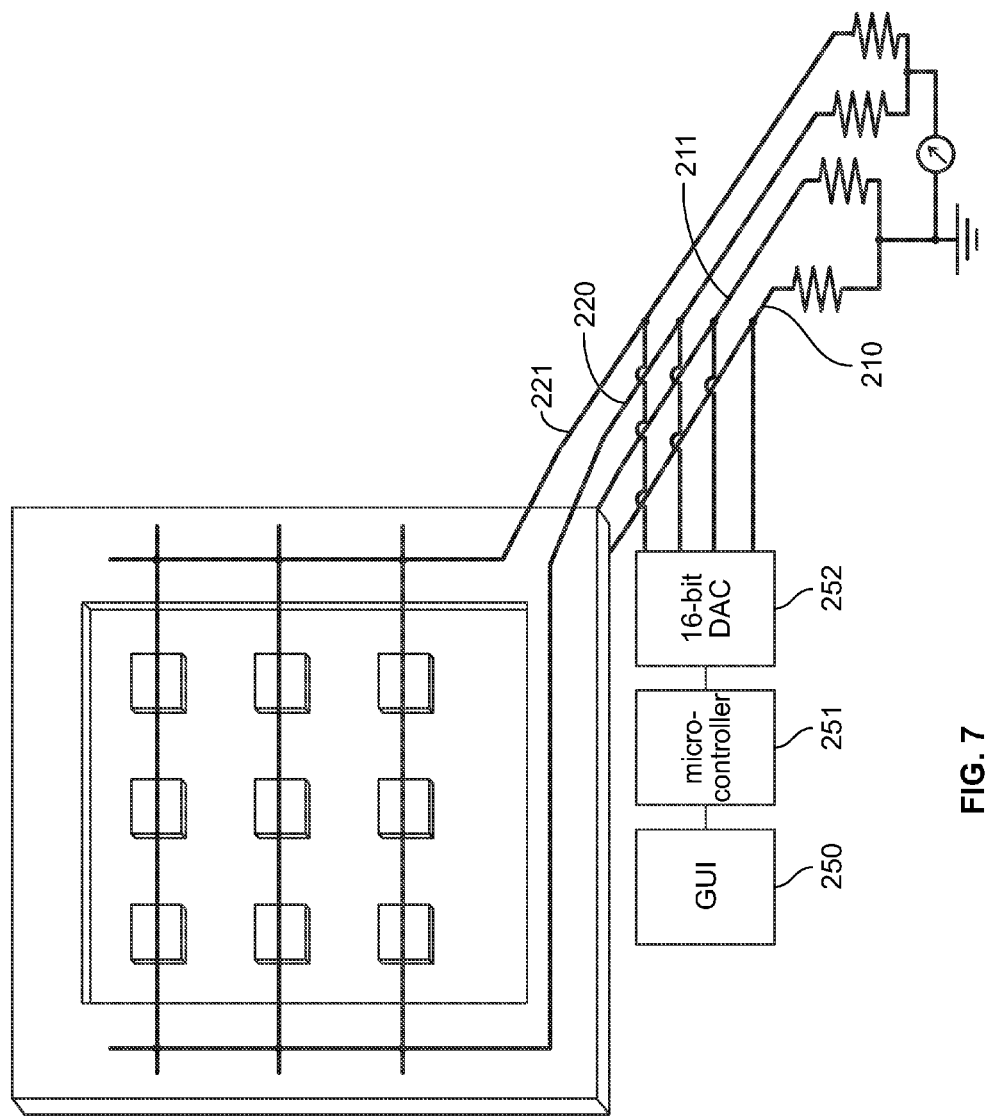
FIG. 7 illustrates an embodiment of the present invention connected to external circuitry.
Figure 8:
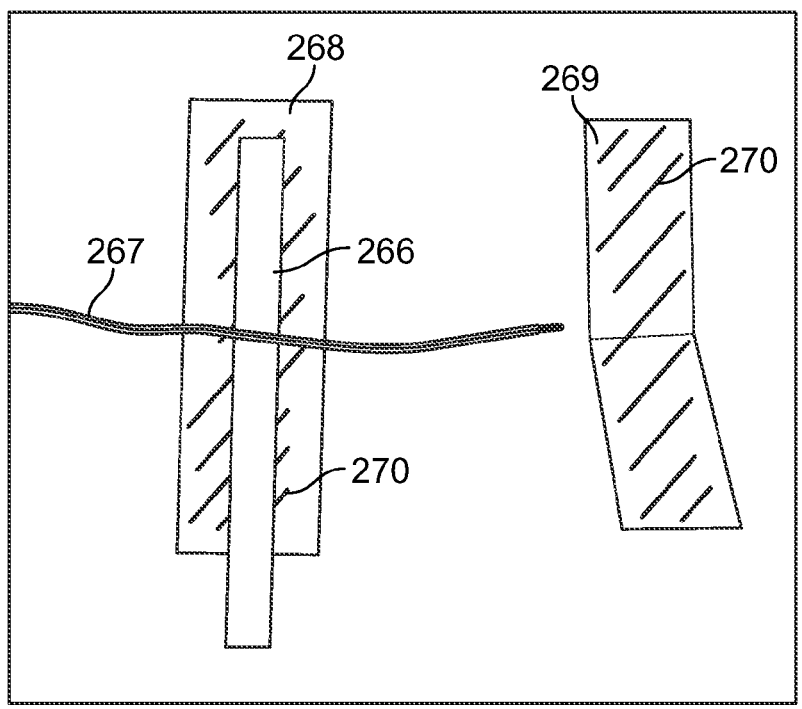
FIG. 8 is a top view of one embodiment concerning the creation of an electrical connection.
Figure 9:
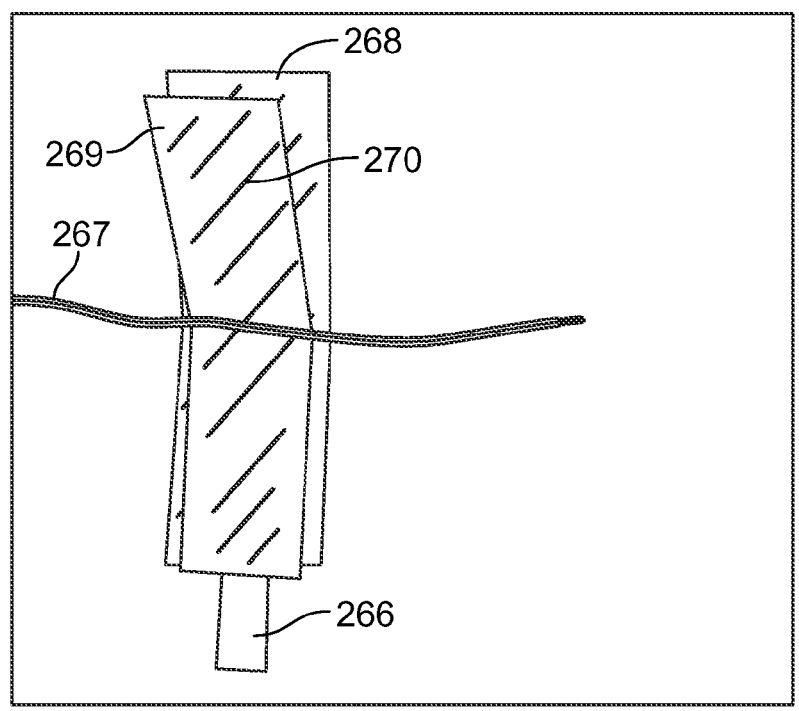
FIG. 9 is a perspective view of the embodiment shown in FIG. 8.
Figure 10:
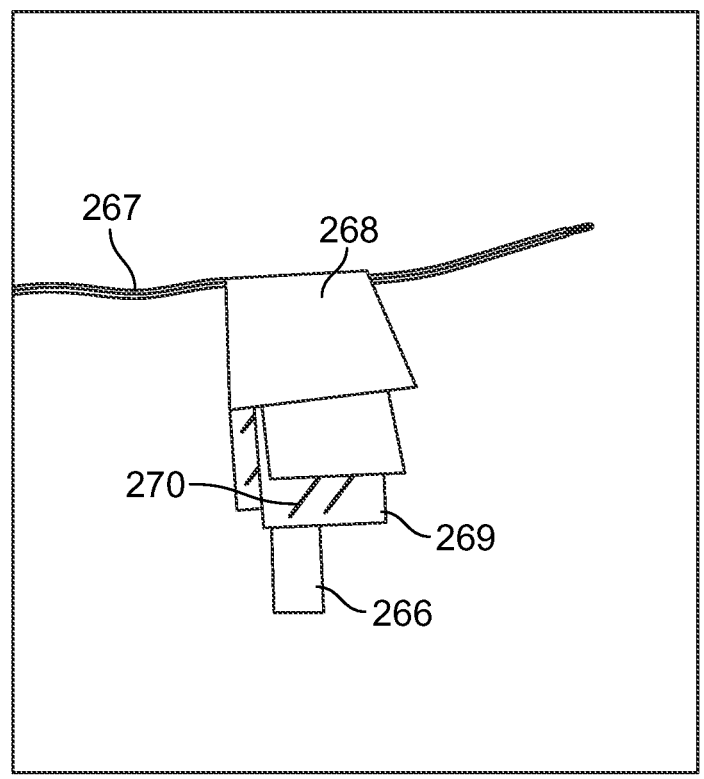
FIG. 10 is a perspective view of the embodiment shown in FIG. 8 in a semi-folded state.
Figure 11:
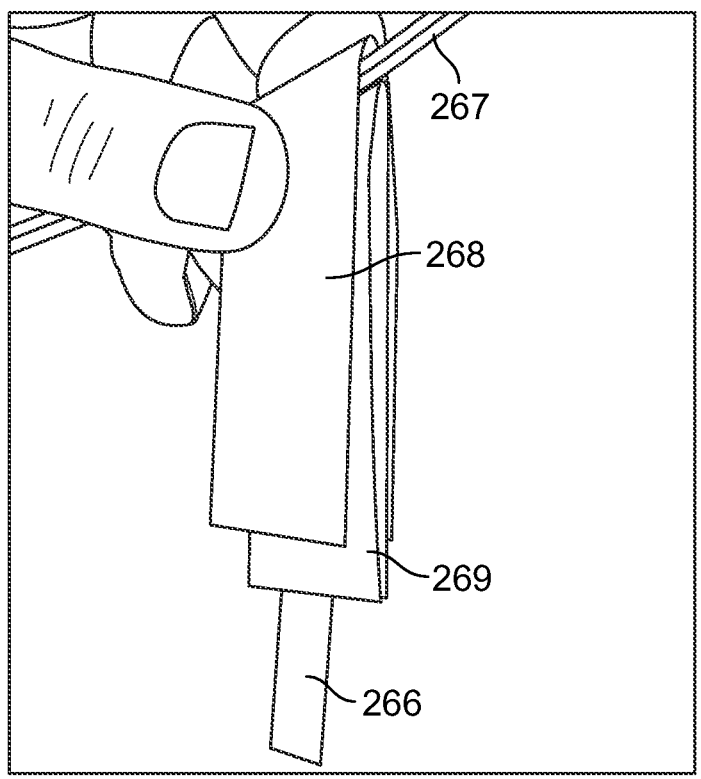
FIG. 11 is a perspective view of the embodiment shown in FIG. 8 in a fully folded state.

Electrical contact and connection of the fibers to bus lines 210-211 or 220-221, is accomplished by placing electrically-conductive bus wires in contact with exposed lengths/portions of the semi-conductive grid fibers, as depicted in FIGS. 2 and 7. The bus lines may be connected to a microcontroller 250, GUI 251 and DAC 252.

To minimize contact resistance between the semi-conductive grid fibers and the conductive bus wires, a mechanical clamp or an electrical shunt at the point of intersection of the fiber and bus wire may be used. Also, a small coupon of conductive copper adhesive tape (Ted Pella Co., Redding Calif., part number 16067) may be fixed at the bus-wire/semi-conducting fiber intersection, with the adhesive side in intimate contact with the fiber and wire.

An alternative method of connecting the fibers to bus lines is to use an anisotropic conductive paste (ACP), which is widely used in plasma display panel (PDP) or liquid crystal display (LCD) packaging. ACP is a thermally curable epoxy adhesive including conductive balls. The density of balls is so low that the epoxy is an insulating film in its initial formation. However, once ACP is squeezed between two electrodes and cured, the electrodes are connected electrically through the squeezed balls.

Figure 12B:
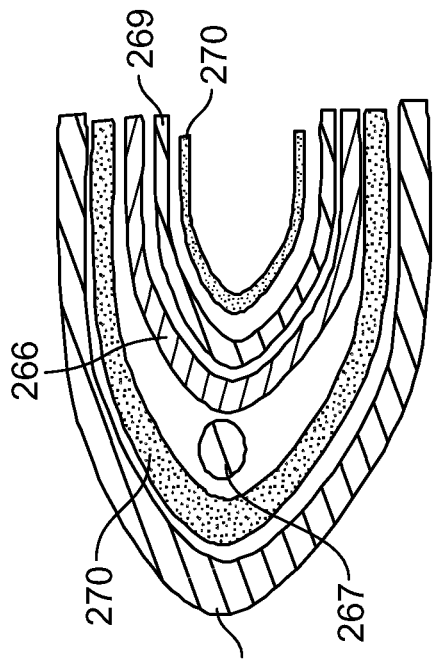
FIG. 12B is a cross-sectional view of one embodiment shown in FIG. 11.
Figure 12A:
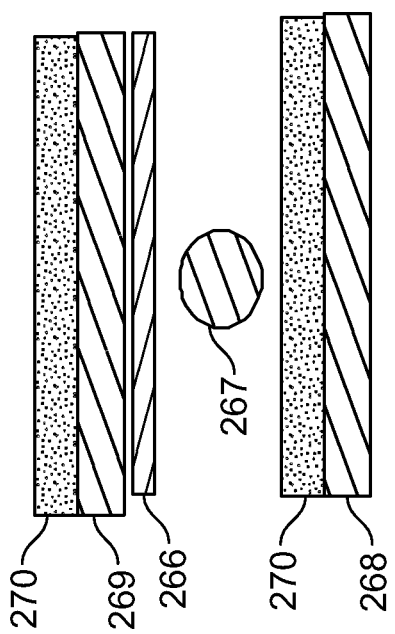
FIG. 12A is a cross-sectional view of the embodiment shown in FIG. 9.

FIGS. 8 through 11 show a method for connecting a fiber 266 to a bus line 267 which are sandwiched between two conductive thin film coupons 268 and 269 such as coupons cut from copper or aluminum thin films. The laminar stack shown in FIG. 12A is creased and completely folded to produce a laminar stack as shown in FIG. 12B. The resulting fold exerts a high-degree of bending deformation on the wire due to establishing and fixing in place a 180 degree bend: (1) towards the crease, there is compressive stress on the wire; (2) away from the crease, there is tensile stress on the wire.

The magnitude of this stress results from the exceptionally small radius of curvature that is imposed on the interposed wire (or wires) when creasing and folding them in a stack of two thin films. These stresses are effective in producing a high degree of binding force (crimping force) between an interposed wire or set of wires, and the conductive metal films, thereby establishing low-resistance electrical contact.

Optionally, one or more wires additional wires are placed in parallel to the first wire, or in rough alignment with the first wire but not overlapping, or in rough alignment with the first wire and overlapping; in all events thereby creating a conventional electrical splice.

Optionally, one or more wires, either conductive or semi-conducting, may be added at, near or within the crease, preferentially but not necessarily in parallel with the direction of the crease. Also, one or both surfaces of one or both of the conductive film coupons may be coated with a conductive adhesive 270, which serves: (i) to enhance the lamination of the resulting folded stack (and thereby reduce the propensity of the stack to delaminate with time and/or subsequent mechanical manipulation of the device); and (ii) to further reduce the contact resistance of all conductive elements in the stack. Electrical contact with one or more sandwiched wires may also be made by direct soldering of an external wire to the exterior of the metal stack, or mechanical clamping of an electrical wire lead to the exterior of the metal stack.

A pressure event is an event in which a load (pressure) is applied at a particular location on the sensor at or near a metal coupon. A pressure event causes a compression of the elastomeric PDMS layer 106 as depicted schematically in FIGS. 13 through 16.

Figure 13:
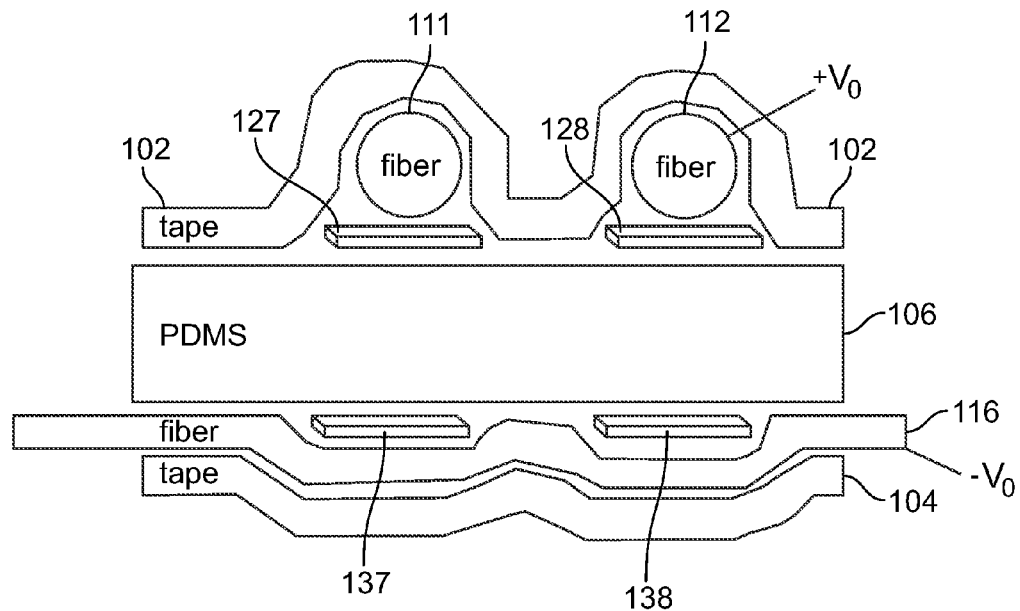
FIG. 13 is a cross-sectional view illustrating an embodiment of the present invention in an uncompressed state.
Figure 14:
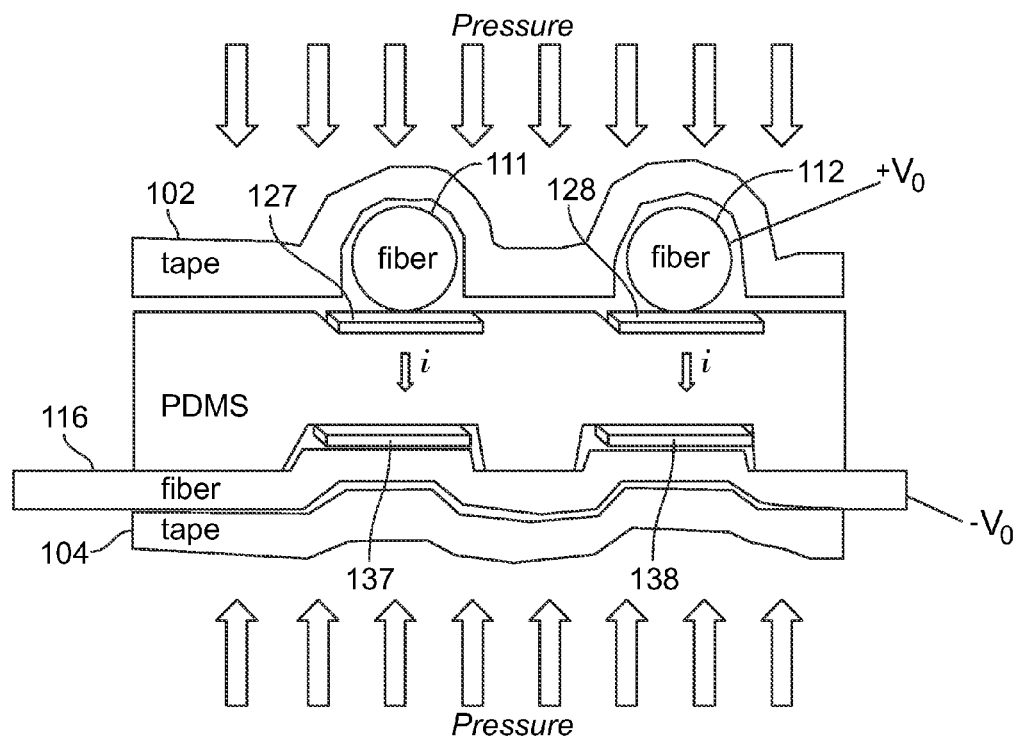
FIG. 14 is a cross-sectional view illustrating an embodiment of the present invention in a compressed state as a result of undergoing a pressure event.
Figure 15:
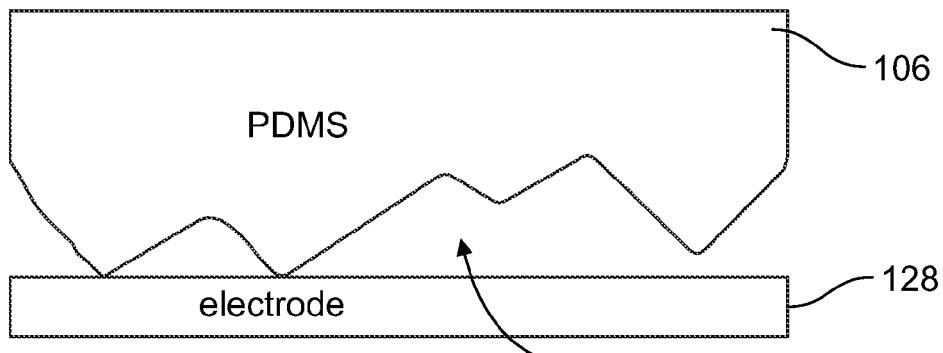
FIG. 15 is an exploded cross-sectional view of the engagement surface of an embodiment of the present invention when the pliable layer is in an uncompressed state as well as the state of the surface asperities found on the pliable layer.
Figure 16:
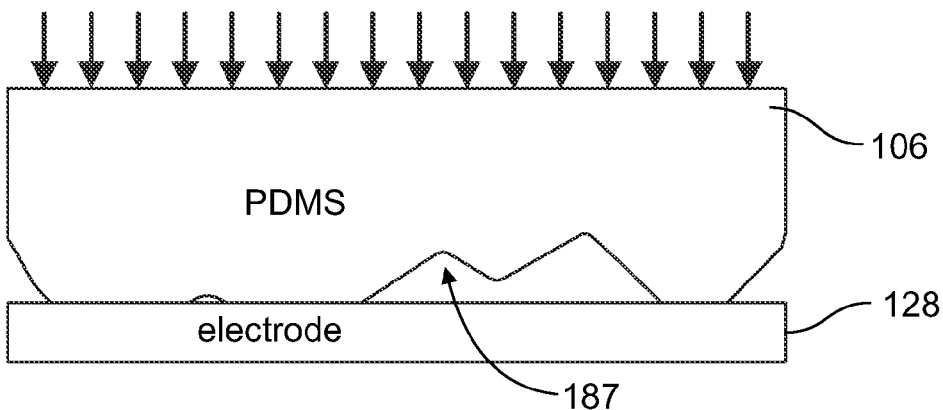
FIG. 16 is an exploded cross-sectional view of the engagement surface of an embodiment of the present invention when the pliable layer is in a compressed state as well as the state of the surface asperities found on the pliable layer.

As shown in FIGS. 13 and 15, in the absence of a pressure event, layer 106 remains undeformed and, and as a result of the surface asperities 187 found on layer 106, the amount of surface area of layer 106 in contact with an individual coupon, engagement surface, such as on coupon 128, remains constant. Upon a pressure event, the force compresses and thereby deforms the impacted area of layer 106 which causes the jagged/rough asperities of layer 106 to collapse and increase the surface area in contact with coupon 128, thereby increasing the contact area of the engagement surface as shown in FIG. 16. Thus, as shown in FIGS. 15 and 16, in an unstressed state engagement surface at coupon 128 is less than the engagement surface at coupon 128 when a pressure event occurs.

The change in surface contact results in a measurable change in resistance of a conductive path through the PDMS, as a function of a pressure-induced change in contact resistance. As the pressure increases, there is a change in resistance across the conductive rubber layer which is a function of applied force (pressure) for a single resistive cell.

As the amount of surface area of layer 106 in contact with a coupon increases, the electrical contact resistance (i.e., increase in electrical contact conductance) between the surface of the metal coupon in contact with the surface of the conductive PDMS decreases. This causes an electric potential (voltage) drop across the PDMS layer thereby allowing a current, i, to flow through the PDMS layer, via the pair of adjacent fibers above and below the coupon. This is the basis of resistive tactile sensing by the present invention.

Figure 17:
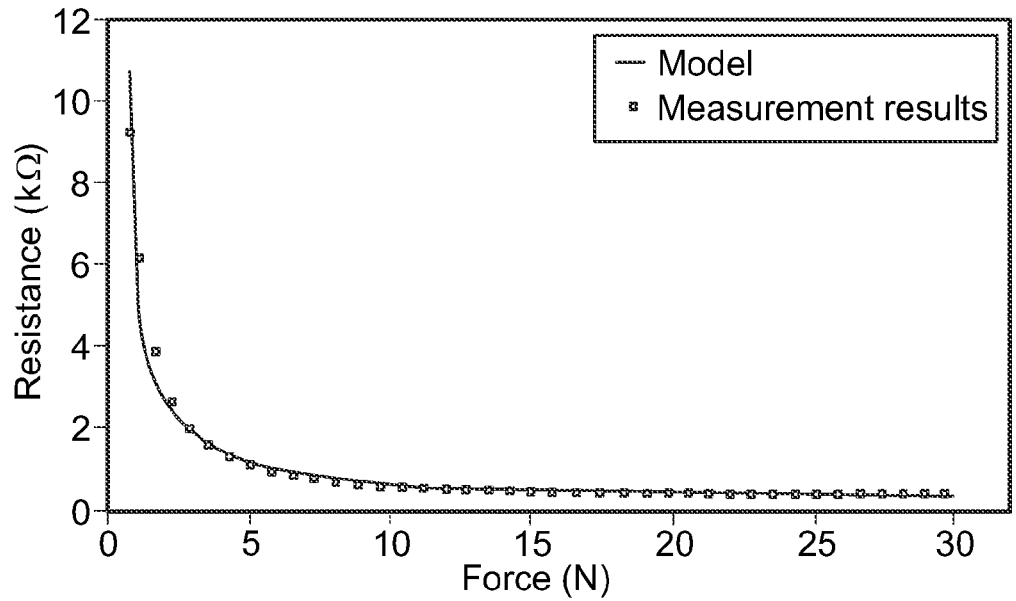
FIG. 17 is a graph of resistance versus force.

Initially, a small compressive force causes a large drop in resistance (as the contact area increases rapidly and causes the contact resistance to drop). With increasing force, the drop in resistance becomes progressively smaller and smaller (as full surface contact with the electrodes is achieved). FIG. 17 depicts resistance versus force for a silicone rubber sensor.

In an alternate embodiment, the external circuitry may be configured as described in Shimojo (U.S. Pat. No. 7,784,362, which is incorporated herein by reference). In another embodiment, the external 4-wire bus wire circuitry is rearranged to produce a 1-D output, so that both the fiber sets are connected in the same direction (e.g., both in a "North- South" direction). The result is loss of the other direction, (i.e., the "East-West" position sensitivity), in this 1-D version, even though a 2-D fabric is used. This variation could function as a linear potentiometer.

Figure 18:
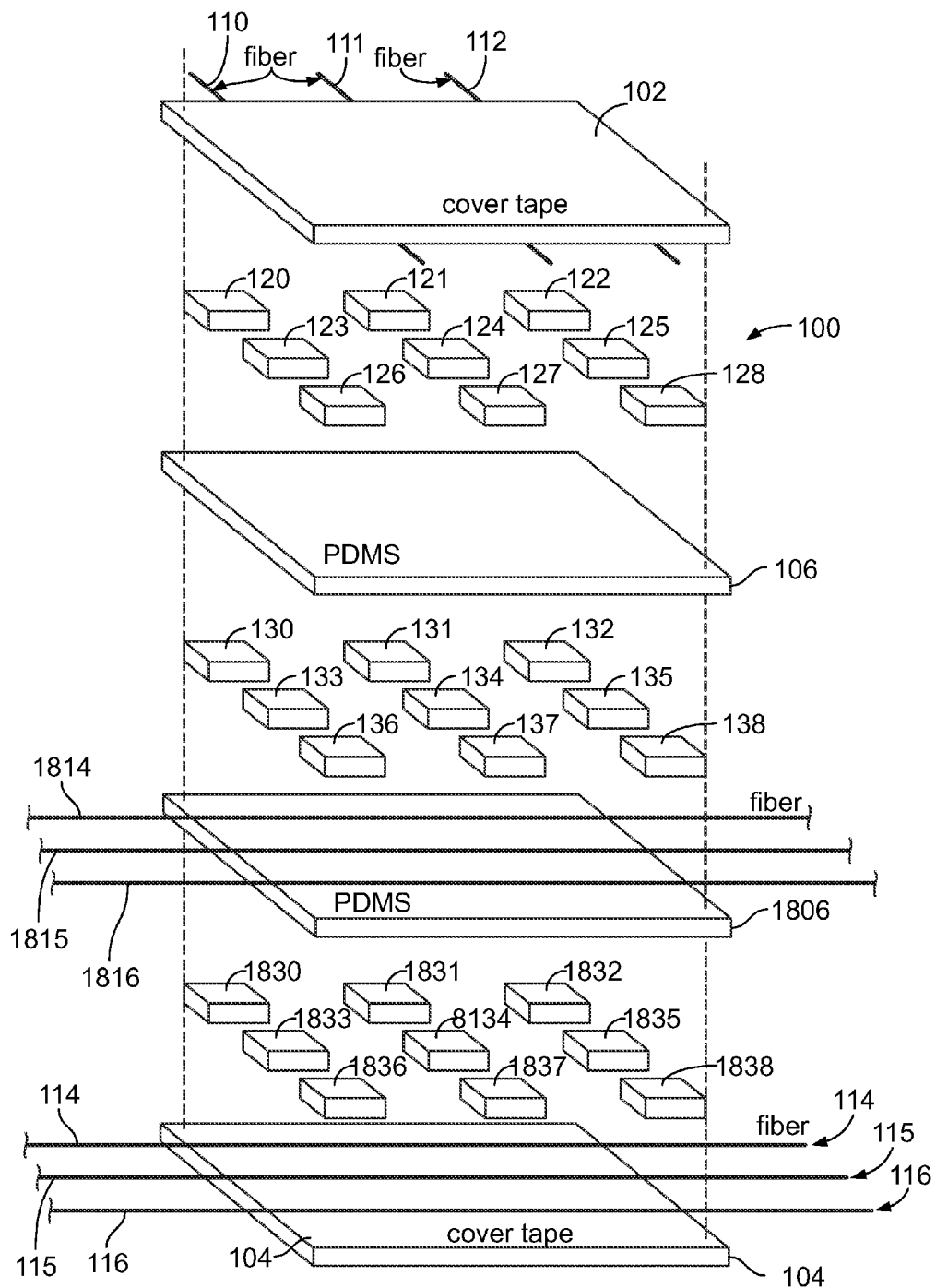
FIG. 18 is an exploded orthogonal view of another embodiment of the present invention.

FIG. 18 depicts another embodiment of the present invention. In this embodiment, the pressure-sensing structure may comprise two layers 106 and 1806; three fibers sets 110-112, 114-116 and 1814-1816; and three coupon sets 120-128, 130-138 and 1830-1838. This structure would require 8 wires out. The use of 2 or more PDMS layers provides greater sensitivity, reduced sensitivity to antennae effects, greater positional accuracy if the output of upper and lower layer is signal averaged, or if the upper layer fiber rows are offset from the opposing, spaced apart fiber rows.

Figure 19:
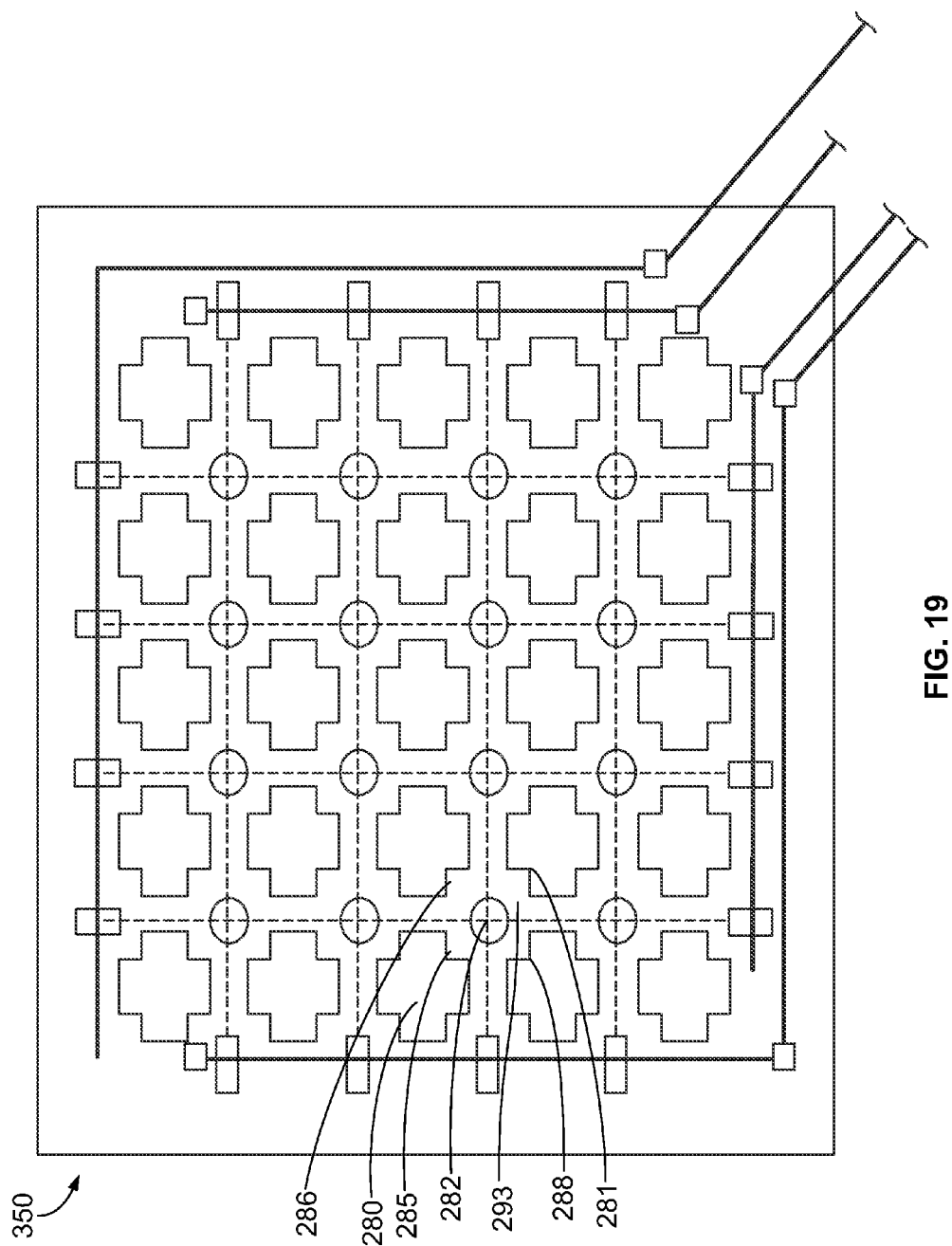
FIG. 19 is top view of another embodiment of the present invention.

FIG. 19 illustrates yet another embodiment in which selective portions of one or more layers of the device, such as layers 102, 104 and 206, which are not in contact with individual sensor components, fibers and bus wires are removed to create cutouts by a knife, laser, punch or other cutting or removal device. This embodiment produces a net or mesh-like form 350 that has an exceptionally high degree of breathability and pliability.

As shown in FIG. 19, a preferred cutout 280 is cross-like in shape which may be pattern that is repeated throughout the device. While other cutout shapes may be circular and in other patterns, cross-like shape 280 is preferred since it results in each individual coupon or contact, as represented by coupon 282, being commensurately surrounded by a square-like portions of material 293 that has four 90-degree corners 285-288. Configuring the device in this manner, with the cutouts a spaced distance from the coupons, maintains flexibility of the device while providing enhanced structural support for the coupon or contact.

In other embodiments of the present invention, the external circuitry comprises an A/D convertor, battery, microcontroller, wireless transmitter, and other electronics, all located in a single "black box".

In the prototypes of pressure-sensing fabrics that have been fabricated and tested, leakage currents across the PDMS layer 106 when un-loaded (no pressure applied) are less than 5 mV. Moreover, there is no hard constraint on the relative size of the coupon versus the fiber diameter. The fiber diameter can extend beyond the edges of the coupon, or it may sit well inside the edges of the coupon. In general, for optimum performance, the fiber diameter should not exceed the coupon width, to avoid a situation in which some fraction of the individual filaments in a given yarn are not carrying current.

Nor is there an upper constraint on the voltage applied across the PDMS layer 106. A typical voltage is 5V. However, a low voltage/low amperage device may be important for medical applications or in applications requiring regulatory approval.

It has been determined that a range of operating voltages for the pressure-sensing fabrics of the present invention is 1-9 Volts. In addition, it has been found that the range of pressures that can be sensed by the present invention is expansive. Even a finger brushed very lightly on one sensor produces a substantial electrical response that is easily measured.

Figure 20:
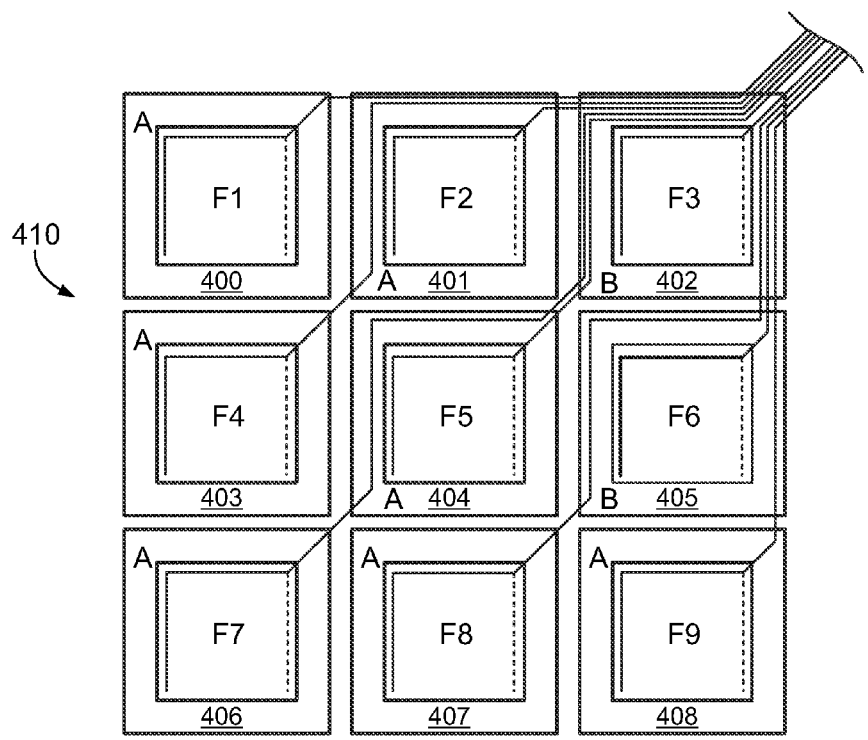
FIG. 20 is a top view of another embodiment of the present invention.

In yet other embodiments of the present invention, individual separate polygon-shaped pressure-sensing arrays are joined, in a quilt-like fashion, to produce large-area sensor arrays requiring only 4 transmission wires per piece. Once so formed, individual pieces are then joined together in the manner of a quilt using commonly known methods such as glue, clamps, staples, fiber stitching, or clamping frames as shown in FIG. 20 which depicts a quilted, large-area sensor array, comprising a conceptual wiring design of a 9-piece quilt.

Figure 21:
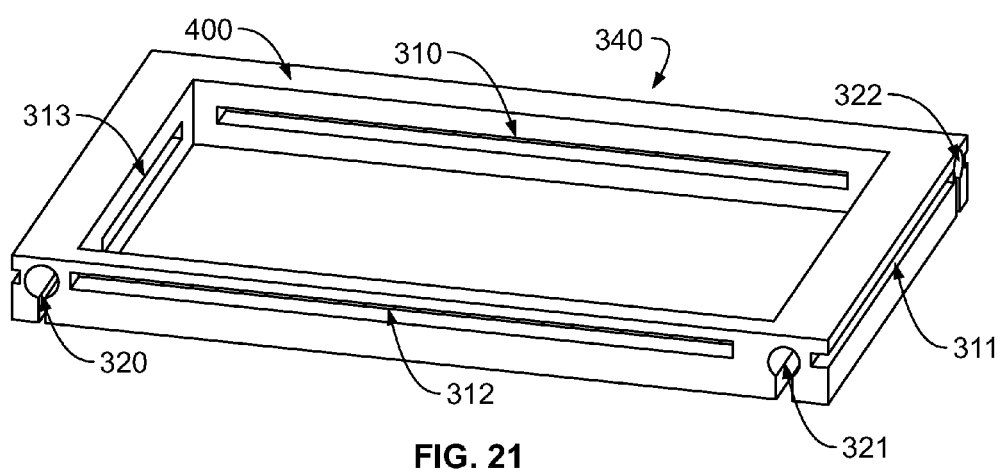
FIG. 21 is a perspective view of a frame used with the embodiment shown in FIG. 20.

In this embodiment, a composite sensor array 410, which may comprise 9 individual frames 400-408, each containing a sensor as described above located therein, is shown in FIG. 20. Each individual frame 340, as shown in FIG. 21, includes a plurality of slots 310-313 slots for gluing or clamping the edges of individual pieces of sensing fabric to be joined into a single quilt. Channels 320-322, which may be in the shape of keyholes, provide a secure location in which to locate necessary wiring.

Figure 22:
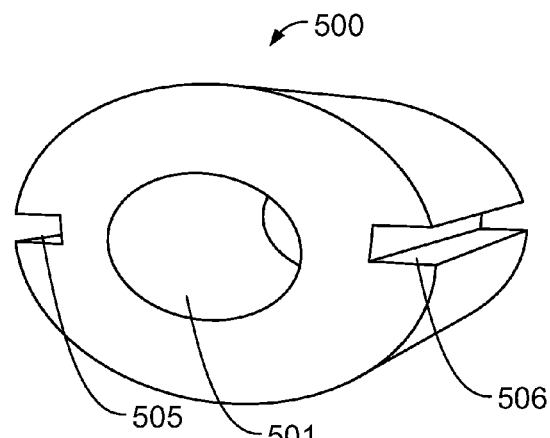
FIG. 22 is a perspective view of an alternate frame used with the embodiment shown in FIG. 20.

FIG. 22 depicts an alternate frame 500 featuring a center hole 501 for housing any necessary wiring. Slots 505-506 are also provided for gluing, clamping, stapling or sewing the edges of individual pieces of sensing fabric.

Figure 23:
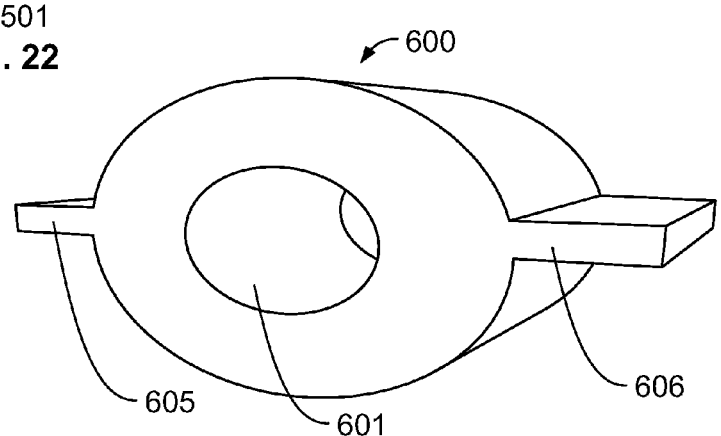
FIG. 23 is a perspective view of yet another frame used with the embodiment shown in FIG. 20.

FIG. 23 depicts an alternate frame 600 featuring a center hole 601 for housing any necessary wiring. Tabs 605-606 are also provided as a stable structure to which a fabric edge may be secured by stapling, gluing, sewing with thread, clamped and by other affixing means known to those of skill in the art.

Figure 24:
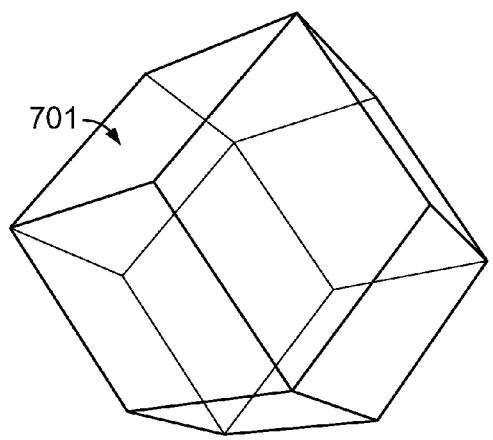
FIG. 24 is a perspective view the embodiment shown in FIG. 20 comprised of rhombic-shaped sections.
Figure 25:
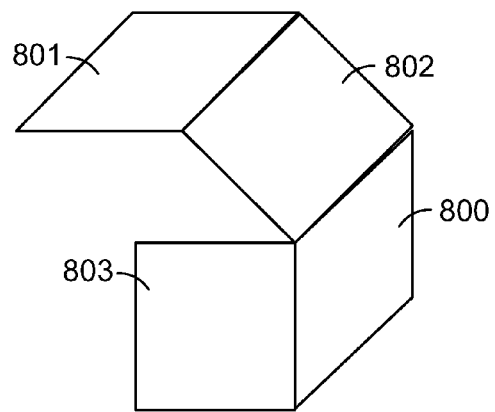
FIG. 25 is a perspective view the embodiment shown in FIG. 20 comprised of rhombic-shaped and square-shaped sections.

As shown in FIG. 24, the sensors may be formed into a quilt comprised of individually rhombus-shaped sensors 701. Alternately, as shown in FIG. 25 combinations of rhombuses and squares may be used as well. Configuring the arrays in this manner permits a sensor array that may be created into a number of form-fitting shapes, such as shirts, socks, hats, pants, gloves, and saddles and in other desired forms.

The present invention has applications in the medical field including use as assisted-living patient monitoring, post-operative patient monitoring, anaesthetized patient monitoring, in-home elderly monitoring (person-down detection), the training of medical students on pressure-sensitive operations such as intubation, improved prosthetic fitting and monitoring and location-specific concussion monitoring. Other uses include robotic tactile sensing, rug-based intruder detection and sports training.

What is claimed is:

1. A pliable pressure sensitive sensor comprising:
   first and second pliable protective layers;
   a first plurality of electrically connected conductive fibers and a second plurality of electrically connected conductive fibers disposed between said protective layers;
   an electrically conductive pliable layer, which deforms in response to a pressure event disposed between said protective layers, said pliable layer having surfaces having asperities;
   said electrically conductive pliable layer further disposed between said first and second pluralities of electrically conductive fibers to spatially separate said first plurality of fibers from said second plurality of fibers;
   a plurality of individual coupons located between said first plurality of conductive fibers and said pliable layer and between said second plurality of conductive fibers and said pliable layer, said plurality of coupons located in predetermined locations along said fibers;
   each of said individual coupons having an engagement surface defined by the amount of surface area of said pliable layer in contact with an individual coupon; and
   said engagement surface increases in response to a pressure event in proximity to said individual coupon, which deforms said pliable layer to compress said asperities, whereby an electrical resistance at an individual coupon decreases in response to the pressure event.

2. The pressure sensitive sensor of claim 1 wherein the conductive fibers are a yarn having a plurality of filaments and more than 2 turns per inch and have a range of conductivity from 100-20,000 ohm/cm.

3. The pressure sensitive sensor of claim 1 including a plurality of cutouts located a spaced distance from said coupons whereby said sensor is in the form of a net.

4. The pressure sensitive sensor of claim 1 wherein said electrically conductive pliable layer is made of portions that are non-conductive and portions that are conductive.

5. The pressure sensitive sensor of claim 1 wherein said electrically conductive pliable layer includes a plurality of apertures in which a plurality of POMS coupons are located.

6. The pressure sensor of claim 1 further including at least one bus line which is connected to at least one fiber, said fiber and bus line electrically connected by being located in a crease created by two opposingly located and folded metal coupons.

7. A pliable pressure sensitive sensor array comprising:
a plurality of connected polygon-shaped pressure sensors, each pressure sensor comprising:
first and second pliable protective layers;
a first plurality of electrically connected conductive fibers and a second plurality of electrically connected conductive fibers disposed between said protective layers;
an electrically conductive pliable layer, which deforms in response to a pressure event disposed between said protective layers, said pliable layer having surfaces having asperities;
said electrically conductive pliable layer further disposed between said first and second pluralities of electrically conductive fibers to spatially separate said first plurality of fibers from said second plurality of fibers;
a plurality of individual coupons located between said first plurality of conductive fibers and said pliable layer and between said second plurality of conductive fibers and said pliable layer, said plurality of coupons located in predetermined locations along said fibers;
each of said individual coupons having an engagement surface defined by the amount of surface area of said pliable layer in contact with an individual coupon; and
said engagement surface increases in response to a pressure event in proximity to said individual coupon, which deforms said pliable layer to compress said asperities, whereby an electrical resistance at an individual coupon decreases in response to the pressure event.

8. The pressure sensitive sensor of claim 7 wherein the conductive fibers are a yarn having a plurality of filaments and more than 2 turns per inch and have a range of conductivity from 100-20,000 ohm/cm.

9. The pressure sensitive sensor of claim 7 including a plurality of cutouts located a spaced distance from said coupons whereby said sensor is in the form of a net.

10. The pressure sensitive sensor array of claim 7 wherein at least one pressure sensor is rhombic in shape.

11. The pressure sensitive sensor array of claim 7 further including at least one bus line which is connected to at least one fiber, said fiber and bus line electrically connected by being located in a crease created by two opposingly located and folded metal coupons.

12. The pressure sensitive sensor of claim 7 wherein said electrically conductive pliable layer is made of portions that are non-conductive and portions that are conductive.

13. The pressure sensitive sensor of claim 7 wherein said electrically conductive pliable layer includes a plurality of apertures in which a plurality of PDMS coupons are located.

14. The pressure sensitive sensor array of claim 7 wherein each of said pressure sensors is secured within an individual frame.

15. A pliable pressure sensitive sensor comprising:
first and second pliable protective layers;
a plurality of electrically conductive pliable layers, which deform in response to a pressure event, disposed between said protective layers, said pliable layers having surfaces having asperities;
a plurality of electrically conductive fiber sets, each fiber set respectively in electrical communication with one of said plurality of electrically conductive pliable layers and each member of said fiber set spatially separated by the pliable layer the set is in electrical communication with;
a plurality of individual coupon sets, each coupon set respectively located in predetermined locations and in electrical communication with one of said plurality of electrically conductive a select conducted pliable layers and each member of said coupon set spatially separated by the pliable layer the set is in electrical communication with;
each of said individual coupons having an engagement surface defined by the amount of surface area of said pliable layer in contact with an individual coupon; and
said engagement surface increases in response to a pressure event in proximity to said individual coupon, which deforms said pliable layer to compress said asperities, whereby an electrical resistance at an individual coupon decreases in response to the pressure event.

16. The pressure sensitive sensor of claim 15 wherein the conductive fibers are a yarn having a plurality of filaments and more than 2 turns per inch and have a range of conductivity from 100-20,000 ohm/cm.

17. The pressure sensitive sensor of claim 15 including a plurality of cross-shaped cutouts located a spaced distance from said coupons whereby said sensor is in the form of a net.

18. The pressure sensitive sensor of claim 15 wherein said electrically conductive pliable layer is made of portions that are non-conductive and portions that are conductive.

19. The pressure sensitive sensor of claim 15 wherein at least one of said electrically conductive pliable layers includes a plurality of apertures in which a plurality of PDMS coupons are located.

20. The pressure sensor array of claim 15 further including at least one bus line which is connected to at least one fiber, said fiber and bus line electrically connected by being located in a crease created by two opposingly located and folded metal coupons.

* * * * *